United States Patent [19]

Ranes

[11] Patent Number: 5,674,044
[45] Date of Patent: Oct. 7, 1997

[54] APPARATUS FOR TOWING MOTORCYCLES

[76] Inventor: Paul S. Ranes, 1307 SW. 160th, Seattle, Wash. 98166

[21] Appl. No.: 500,030

[22] Filed: Jul. 11, 1995

[51] Int. Cl.⁶ .................................................. B60P 3/06
[52] U.S. Cl. .......................... 414/563; 414/462; 414/537; 280/402; 410/19
[58] Field of Search .................................. 414/462, 563, 414/537, 426, 430; 224/537, 924; 280/402; 410/9, 19, 30

[56] References Cited

U.S. PATENT DOCUMENTS

| | | | |
|---|---|---|---|
| 2,789,832 | 4/1957 | Zumwalt | 280/292 |
| 3,428,332 | 2/1969 | McCance | 280/402 |
| 3,430,983 | 3/1969 | Jones | 280/402 |
| 3,776,572 | 12/1973 | Bane | 280/292 |
| 3,778,087 | 12/1973 | Kallenbach | 280/292 |
| 3,822,898 | 7/1974 | Brownlie | 280/402 |
| 3,837,513 | 9/1974 | Adamek | 414/462 |
| 3,843,001 | 10/1974 | Willis | 214/450 |
| 3,912,098 | 10/1975 | Nicotra | 214/450 |
| 3,979,137 | 9/1976 | Lipscomb, Jr. et al. | 280/402 |
| 4,046,297 | 9/1977 | Bland | 224/924 X |
| 4,275,981 | 6/1981 | Bruhn | 224/537 X |
| 4,592,564 | 6/1986 | Warnock et al. | 280/402 |
| 4,921,152 | 5/1990 | Kemming | 224/924 X |
| 5,145,308 | 9/1992 | Vaughn et al. | 414/462 |
| 5,253,410 | 10/1993 | Mortenson | 414/537 X |
| 5,366,338 | 11/1994 | Mortensen | 414/563 |
| 5,462,398 | 10/1995 | Hymer | 414/537 X |
| 5,531,560 | 7/1996 | Bartholomew | 414/563 |

FOREIGN PATENT DOCUMENTS 2256403  12/1992  United Kingdom ................. 414/563

Primary Examiner—Karen B. Merritt
Assistant Examiner—Stephen Gordon
Attorney, Agent, or Firm—R. Reams Goodloe, Jr.

[57] ABSTRACT

An apparatus for towing motorcycles behind a vehicle. The apparatus includes a frame with a front stop plate, a bottom plate, first and second guide members extending downwardly from the left and right sides of the front stop plate to the respective sides of the bottom plate, and an attachment bar on the forward side of the front stop plate. The attachment bar is preferably in the form of an insert to a tubular type trailer hitch mount and is adapted to be fixedly secured therein. An adjustable wheel clamp with first and second prongs extends rearwardly from the front stop. The wheel clamp is adjustable from a first width $W_1$ between the first and second prongs to a second width $W_2$ between such prongs, to accommodate wheels of different width. The prongs further include a plurality of slots which are adapted for passage therethrough of releasably securable fasteners therethough, so that wheels of different widths may be firmly secured for towing. Also, a footplate is secured to the bottomplate and is adjustable rearwardly and forwardly in order to securely accommodate motorcycle wheels of different diameters.

26 Claims, 4 Drawing Sheets

APPARATUS FOR TOWING MOTORCYCLES

FIELD OF THE INVENTION

My invention relates to an apparatus for towing small vehicles such as motorcycles behind driven vehicles, and more particularly to a novel, improved apparatus which may be attached to tubular towbars for use in towing a motorcycle behind a vehicle.

BACKGROUND

It is often desirable to transport motorcycles to remote locations for recreational use. Typically, small utility trailers have been employed in such applications. However, the cost of such trailers adds undesirably to the cost of participating in such motorsports.

I am aware of various attempts in which an effort has been made to provide an improved motorcycle carrier. Such attempts are largely characterized by designs which include some sort of repositionable catchment or attachment shoe or cradle for the front wheel of the motorcycle. One such design is shown in U.S. Pat. No. 3,430,983 issued Mar. 4, 1969 to J .A. Jones for TRAILER HITCH FOR MOTORCYCLES. In one embodiment, his invention provides a front or top clamping shoe at the end of an adjustable slide; and a bottom shoe which pivots on a pin and latches in the towing position. However, his device does not provide for a simple, positive attachment as provided in my invention. Another design which superficially resembles the instant invention to some remote extent is disclosed in U.S. Pat. No. 5,145,308 issued Sep. 8, 1992 to E. L. Vaughn, et al, for MOTORCYCLE TOWING DEVICE. Vaughn's design uses a pivotable cradle to hold the front wheel of a motorcycle.

For the most part, the documents identified in the preceding paragraph disclose devices which require the repositioning and latching in the towing position of various adjustable parts, and suffer from the shortcomings that they may become unlatched in use, thus resulting in the danger of loss of the motorcycle being towed. Also, some prior art motorcycle trailers do not include any means for utilizing the trailers with existing tubular trailer hitches, thus increasing costs for the trailer system. Thus, the advantages of (a) my simple tubular hitch insert design which may be used with existing tow hitches, and (b) the avoidance of latches as a means to secure attachment of the motorcycle being towed, are important and self-evident.

OBJECTS, ADVANTAGES, AND NOVEL FEATURES

I have now invented, and disclose herein, a novel, design for a motorcycle trailer which does not have the above-discussed drawbacks common to those somewhat similar products heretofore designed or used of which I am aware. Unlike the earlier designs which attempted to provide a multitude of adjustable parts for use in loading and unloading a motorcycle, my product is adaptable to loading and unloading without resorting to pivotable, latchable parts. Further, it is simple, lightweight, relatively inexpensive and easy to manufacture, and otherwise superior to those designs heretofore used or proposed. In addition, it provides a significant, additional measure of safety in towing motorcycles.

From the foregoing, it will be apparent to the reader that one important and primary object of the present invention resides in the provision of a novel apparatus for towing motorcycles which simplifies loading of a motorcycle for transport, and which improves the simplicity and safety of towing motorcycles by reducing or eliminating reliance on pivotable or latchable parts.

Other important but more specific objects of the invention reside in the provision of a device for towing motorcycles as described herein which:

can be manufactured in a simple, straightforward manner of commonly available materials;

in conjunction with the preceding object, have the advantage that they can be easily and quickly installed by the user in existing conventional trailer tow bars;

which in a relatively inexpensive manner can reduce equipment costs, and enhance safety in the towing of motorcycles.

Other important objects, features, and additional advantages of my invention will become apparent to the reader from the foregoing and the appended claims and as the ensuing detailed description and discussion proceeds in conjunction with the accompanying drawing.

SUMMARY OF THE INVENTION

I have now invented and disclose herein a novel towing apparatus for towing machines having a single front spoked wheel, such as a motorcycle, behind a towing vehicle. The apparatus is useful for towing such machines directly, without the necessity of providing a separate trailer. My towing apparatus includes a frame having a front stop plate and a bottom plate. The front stop plate has a top, a bottom portion, right end portion and a left end portion. The bottom plate has a forward portion, a right side portion, and a left side portion. The forward portion of the bottom plate is joined to said bottom portion of the front stop plate, preferably at a right angle so that the bottom plate extends substantially horizontally and rearwardly from the bottom of the front stop plate. A first guide member is rigidly affixed to the right end portion of the front stop plate and extends therefrom and rigidly joins with the right side portion of the bottom plate. A second guide member is rigidly affixed to the left end portion of the front stop plate and extends therefrom and rigidly joins the left side portion of the bottom plate. An attachment bar is affixed to and extends forwardly from the frame. The attachment bar is adapted to be rigidly affixed to the rear of a towing vehicle, and is preferably adapted for sliding engagement in and being fixedly secured to a conventional tubular hitch receiver. To secure the front wheel of the machine being towed in the towing apparatus, a wheel clamp is provided. The wheel clamp includes a first prong and a second prong which are mounted rearwardly from the front stop plate in opposing fashion. The first and the second prongs each have (i) a clamping portion which is in the form of a substantially vertically oriented, generally parallelpiped shaped bracket having an interior wheel engaging portion, and (ii) a mounting portion which is generally perpendicular to the clamping portion and adapted to be secured to the front stop plate. Preferably, the wheel clamp is adjustable between (i) a first width $W_1$ between the first and second prongs, and (ii) a second width $W_2$ between the first and said second prongs. An adjustable tightenable wheel securing pin is placed behind the felly of the front wheel of the motorcycle being towed, and is tightened into place at any one of the slots which are keyed into the first and second prongs. To protect the rim of the towed machine, a cushioned bushing is provided to cover the wheel securing pin.

My novel towing apparatus provides a simple, secure device for towing motorcycles. This design provides a significant improvement by reducing complexity and manufacturing costs compared to previous designs known to me for towing motorcycles.

DESCRIPTION

Figure 1:
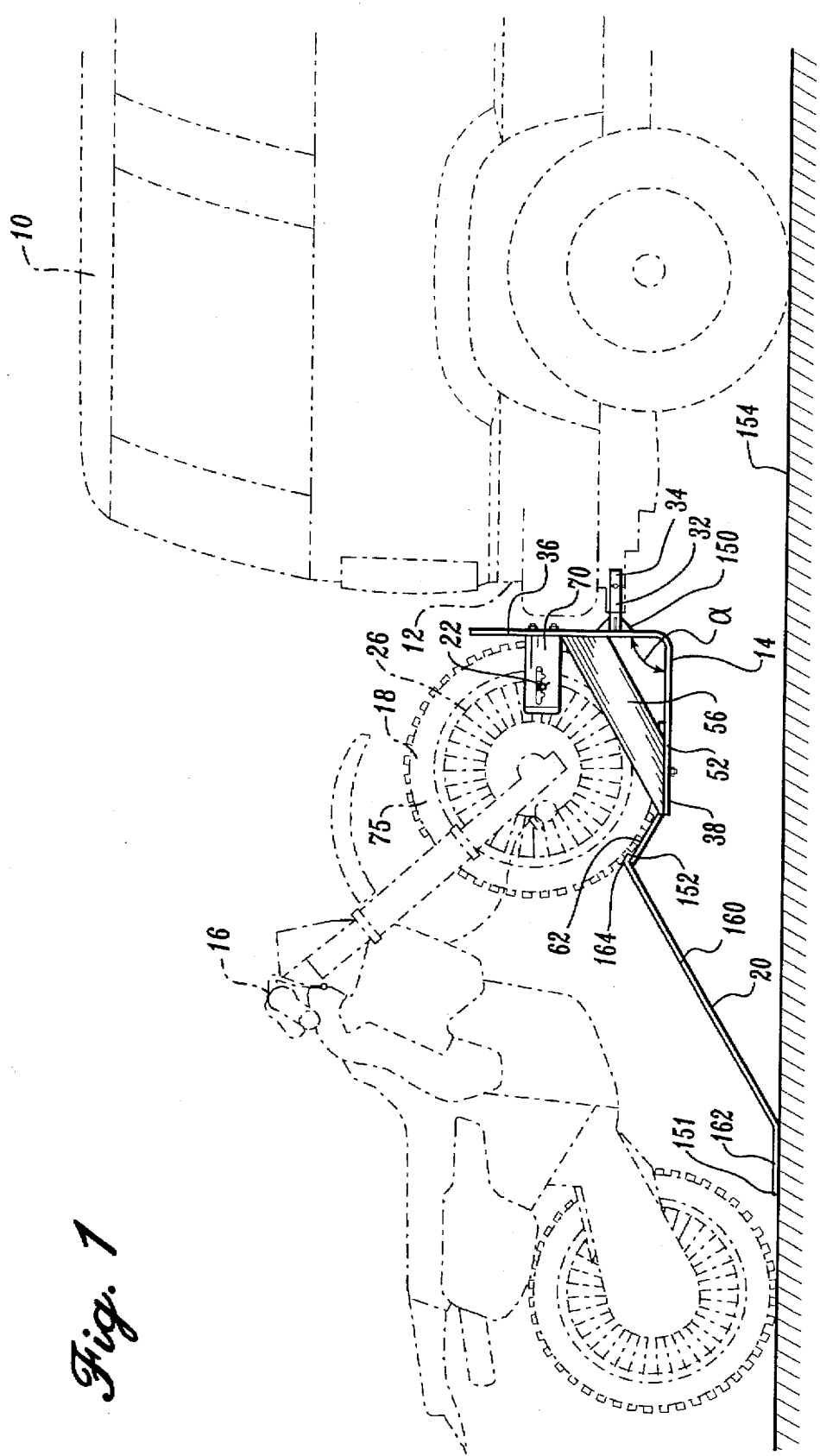
FIG. 1 is a side view of a tow apparatus according to the present invention, shown mounted at the rear of a sports utility vehicle and to a trailer hitch frame on that vehicle, showing a ramp for loading the motorcycle into the towing position.

Attention is directed to FIG. 1 of the drawing, where a towing vehicle 10 is shown having affixed to the rear 12 thereof a towing apparatus 14 manufactured according to the present invention. The towing apparatus 14 is shown during the loading phase of a machine 16 such as a motorcycle which has a single spoked front wheel 18 being prepared for towing. The front wheel 18 of machine 16 is driven up the ramp 20 until the front wheel 18 is located in a stable, towing position in towing apparatus 14. Then, to secure the machine 16 in the towing position in apparatus 14, and as may be better seen in FIGS. 2 or 3, an adjustably tightenable wheel securing pin 22 with outer cushioned bushing 24 is inserted behind the felly 26 of front wheel 18, and then the wheel securing pin 22 is tightened prior to towing.

Figure 3:
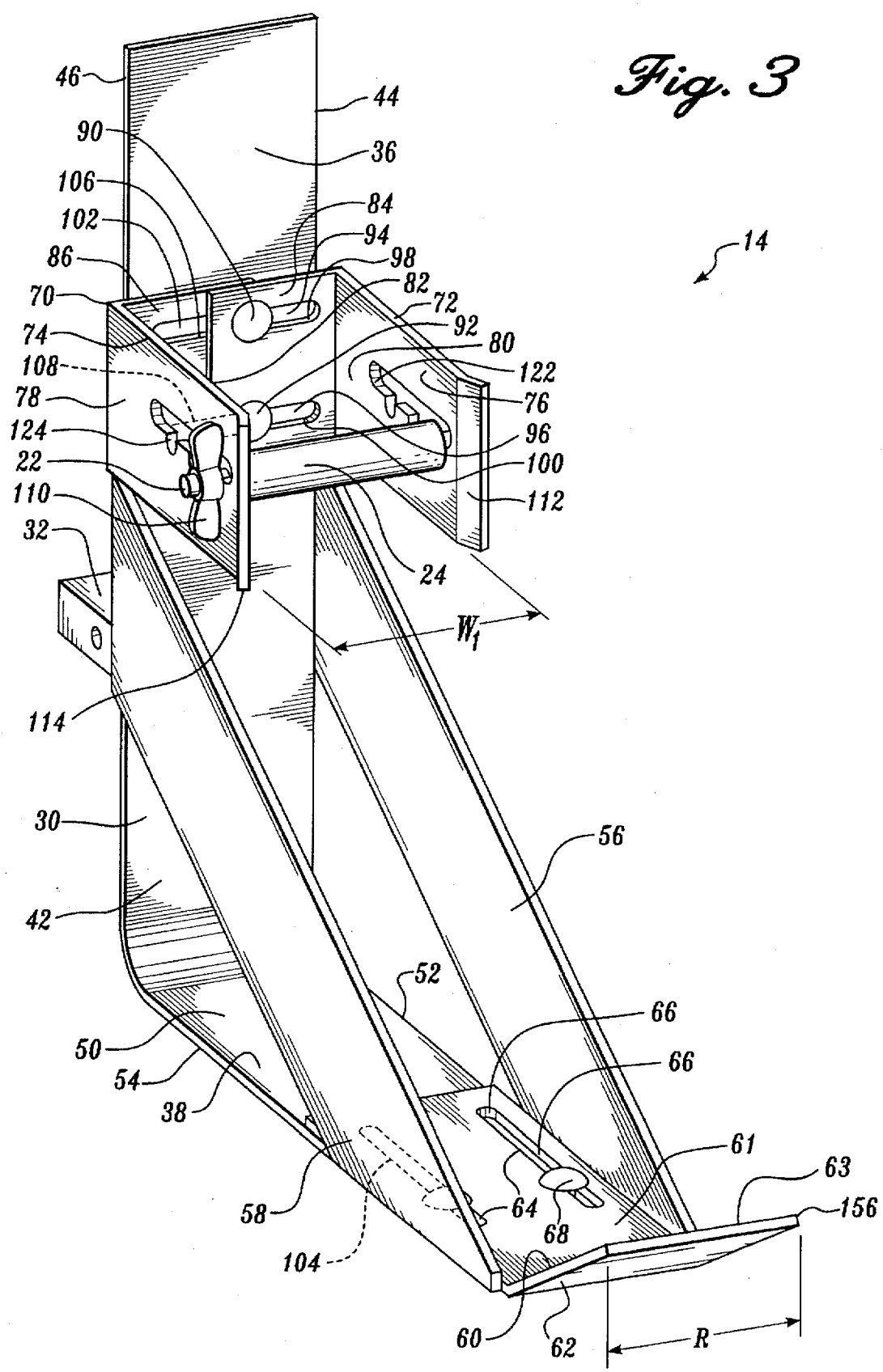
FIG. 3 is a perspective view of the tow apparatus as disclosed herein, showing the clamp portion in a first, expanded configuration to accommodate a wide motorcycle front wheel.
Figure 4:
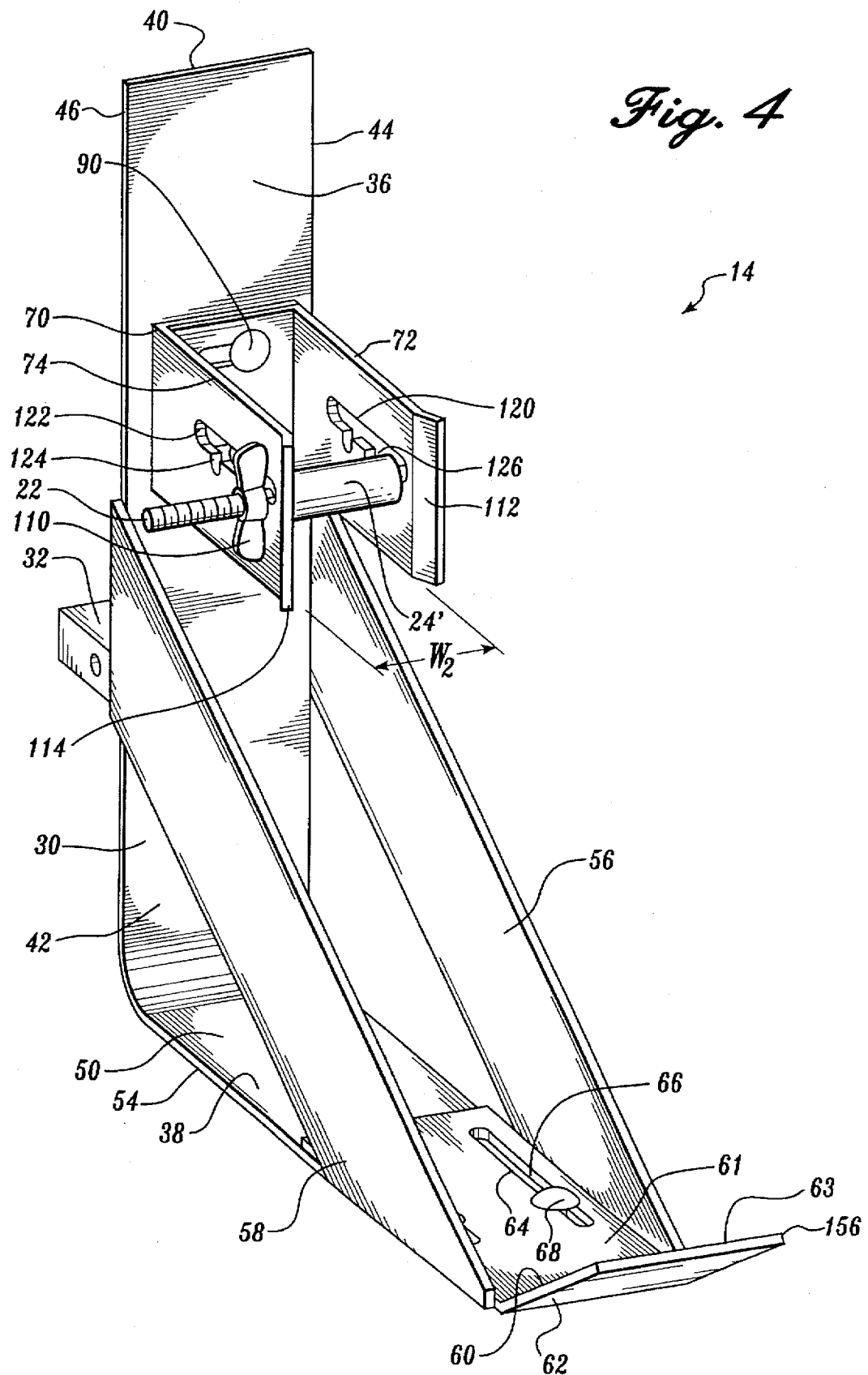
FIG. 4 is a perspective view of the tow apparatus as disclosed herein, showing the clamp portion in a second, narrow configuration to accommodate a narrow motorcycle front wheel.

Many important details of towing apparatus 14 can be easily seen in FIGS. 3 and 4. The towing apparatus 14 includes a frame 30 affixed to an attachment bar 32, which is preferably provided in the form of a tubular type hitching bar adapted to slidably engage and to be fixedly secured in a conventional tubular type hitch receiver 34, which as shown in FIG. 1 above, is attached to towing vehicle 10. The frame 30 includes a front stop plate 36 and a bottom plate 38. The front stop plate 36 has a top 40, a bottom portion 42, a right end portion 44, a left end portion 46, and a forward side portion 48. The bottom plate 38 has a forward portion 50, a right side portion 52, and a left side portion 54. The forward portion 50 of the bottom plate 38 is joined to the bottom portion 42 of the front stop plate 36 at an angle alpha ($\alpha$) of about ninety degrees (90°). Preferably, the front stop plate 36 and the bottom plate 38 are formed into a continuous, one-piece portion of frame 14. Further, a first guide member 56 is rigidly affixed to the right end portion 44 of front stop plate 36 and extends therefrom and rigidly joins with the right side portion 52 of the bottom plate 38. A second guide member 58 is rigidly affixed to the left end portion 46 of front stop plate 36 and extends therefrom and rigidly joins with the left side portion 54.

A footplate 60 of width R, and preferably adjustable forwardly and rearwardly, is affixed to the bottom plate 38 and extends rearwardly therefrom. Footplate 60 has a base portion 61 and an upwardly directed portion 62, preferably bent at an angle beta ($\beta$) of about thirty degrees (30°) upward from the base portion, to provide an upwardly directed surface 63 adapted to fit closely against the front wheel 18 of the machine 16 being towed, when wheel 18 is positioned against the front stop plate 36. The footplate has therein a plurality of longitudinal (rearward/forward running) footplate slots 64, defined by footplate slot edge portions 66, which are adapted for passage of releasably securable fasteners 68 therethough. By releasing the fasteners 68 (shown here in a nut N and bolt B configuration), the footplate 60 and upwardly directed surface 63 may be adjusted between a preselected first rearward length location $L_1$ and a preselected second rearward length location $L_2$ (where the upwardly directed surface is indicated by reference numeral 63'). In this manner, the adjustable footplate 60 allows the towing apparatus 14 to accommodate any desired preselected wheel diameter D of a machine 16 being towed (for instance, wheel 18 or a different wheel 18' with felly 26' as set forth in broken lines in FIG. 2). As a result, any wheel 18 of preselected diameter D fits snugly between the front stop plate 36 and the upwardly directed surface 63 of the footplate 60, and closely between first and second guide members 56 and 58, respectively.

Importantly, a wheel clamp 70 is provided to further secure the wheel 18 to the towing apparatus 14. Wheel clamp 70 has first 72 and a second 74 prongs, which extend rearwardly from the front stop plate 36 for a distance sufficient to allow the prongs 72 and 74 to engage the rubber tire portion 75 of wheel 18. The first 72 and second 74 prongs each are preferably configured with (i) a clamping portion (here shown by reference numerals 76 and 78 for the first 72 and second 74 prongs, respectively), each of which are normally in the form of a vertically oriented, generally parallelepiped shape and having interior wheel engaging portions (reference numerals 80 and 82, respectively), and (ii) a mounting portion (84 and 86, respectively) which is generally perpendicular to the clamping portions 76 and 78. The mounting portions 84 and 86 are secured, and preferably releasably secured, to the front stop plate 36 by first and second fasteners 90 and 92, here shown as adjustable fasteners using nut N and bolt B combinations.

Mounting portion 84 of first prong 72 includes first and second mounting portion slots 94 and 96, defined by first and second mounting portion slot edges 98 and 100, respectively. Mounting portion 86 of second prong 74 includes third and fourth mounting portion slots 102 and 104 (indicated by hidden line of edge 108) defined by third and fourth mounting portion edges 106 and 108 respectively. The releasably securable adjustable fastener 90 travels through slots 94 and 102, and the releasably securable adjustable fastener 92 travels through slots 96 and 104, allowing prongs 72 and 74 to be adjusted between a first position with width $W_1$ between prongs 72 and 74 (as seen in FIG. 3) and a second position with width $W_2$ between prongs 72 and 74 (as seen in FIG. 4). When the width W is changed, a new compressible bushing is used as appropriate, such as bushing 24' as indicated in FIG. 4 with width $W_2$ spacing between prongs 72 and 74.

The adjustably tightenable wheel securing pin 22 is tightened (as shown, with wingnut 110) to bring the interior wheel engaging portion 80 of the first prong 72 and the interior wheel engaging portion 82 of the second prong 74 into frictional engagement with the rubber tire portion 75 of front wheel 18 of the machine 16 being transported. Also, to assist in guiding the rubber tire portion 75 of wheel 18 into the clamp 70, prongs 72 and 74 are preferably provided with outwardly flared wheel entry portions 112 and 114, respectively.

Figure 2:
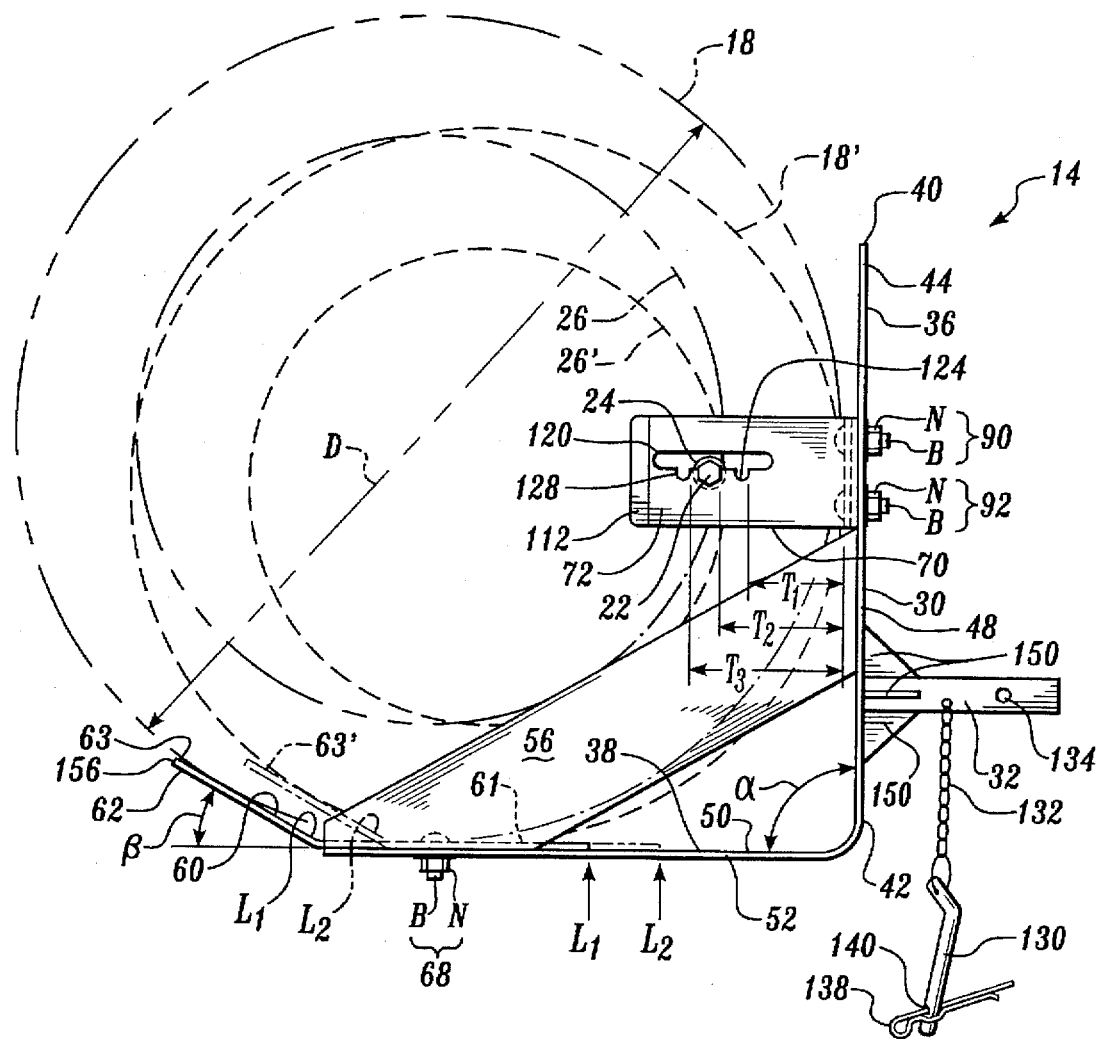
FIG. 2 is a side view of the tow apparatus first shown in FIG. 1, with the positions of major components shown to various cycle wheels which are shown in hidden lines.

I have found it advantageous, in order to secure the machine 16 in the towing apparatus 14, to provide in prongs 72 and 74 a set of preferably mirror image multiple keyed slots 120 (the duplicate keyed slots will be referenced with a single set of reference numerals as the features are replicated in prongs 72 and 74). The multiple keyed slots 120 provided in each of prongs 72 and 74 are defined by multiple keyed slot edges 122 which locate multiple keys (three keys 124, 126, and 128 are illustrated), so that any one of the sets of multiple keys 124, 126, or 128 can cooperate to locate and seat therein the adjustably tightenable wheel securing pin 22. As noted above, a compressible, pliable bushing 24 or 24' provides a cushion between pin 22 and the felly 26 of wheel 18. As indicated in FIG. 2, the towing apparatus 14 preferably includes three or more keys (here noted as keys 124, 126, and 128), so that at least one of the available keys is located in (a) the position of the felly of a wheel of a first preselected wheel thickness $T_1$ of a machine 16 such as a motorcycle being towed, or (b) in the position of the felly of a wheel of a second preselected wheel thickness $T_2$ of a machine 16 being towed, or (c) in the position of the felly of a wheel of third preselected wheel thickness $T_3$ of a machine being towed. Comparing FIG. 4 and FIG. 2, FIG. 2 indicates that the middle key, 126, is utilized to locate pin 22 as shown in FIG. 2 to accommodate a wheel 18 of thickness $T_2$.

The attachment bar 32 is affixed to frame 30 and extends forward the frame 30. The attachment bar 32 is adapted to be rigidly affixed to the rear 12 of a towing vehicle 10. Ideally, the towing vehicle 10 has a rear mounted tubular type hitch receiver 34, so that attachment bar 32 is preferably provided in a square tubular type hitching bar, so that bar 32 can be slidably inserted into the hitch receiver 34. A conventional hitch pin 130, attached to bar 32 via chain 132, can be inserted through an aperture 134 provided in attachment bar 32, and through a complimentary aperture 136 (not shown) provided in hitch receiver 34 (after alignment of the apertures 134 and 136) to fixedly secure towing apparatus 14 to the hitch receiver 34. A keeper 138 such as a cotter pin, adapted to fit through a keeper hole 140 in pin 130, may be utilized for keeping hitch pin 130 in place to assure that towing apparatus 14 remains affixed to the towing vehicle 10.

I prefer to build the towing apparatus 14 in a configuration as illustrated where the attachment bar 32 is affixed to the forward side portion 48 of the front stop plate 36. Ideally, a plurality of stiffening angle portions 150 are provided between the attachment bar 32 and the frame 30. In the configuration illustrated, the stiffening angle portions 150 are welded to the attachment bar 32 and to the front side portion 48 of front stop plate 36, forming a wedge therebetween to minimize deflection between the front stop plate 36 and the attachment bar 32.

To load a machine 16 with a single spoked front wheel 18 for towing, the front wheel 18 of machine 16 is driven up the ramp 20 until the front wheel 18 is located in the towing apparatus 14. The ramp has a ground end 151 and a footplate end 152. The ramp 20 is provided to extend from ground 154 level to the rearward tip end 156 level of footplate 60. This enables the user to use the ramp to load the front wheel of a motorcycle for towing. To accomplish this task, the ramp 20 is provided with a main body portion 160, a ground or landing portion 162, and a loading portion 164. Roughly, the ramp is provided with a landing portion 162 joined to the body portion 160 at an angle delta ($\Delta$) of approximately one hundred fifty degrees (150°), to provide a gradual upwardly sloped ramp 20. At the upper end of the ramp 20, the loading portion 164 is preferably provided in the shape of a downwardly directed lip which fits over the tip end 156 of footplate 60. Preferably, the loading portion 164 fits snugly against the upper surface 63 of said footplate 60 when the ramp 20 is in the loading position. Basically, the loading portion 164 is provided for a distance sufficient to provide adequate support during the usual movement experienced when loading the relatively heavy machine 16 in the tow apparatus 14. Ideally, the ramp 20, including the loading portion 164, has a width at least as wide as the footplate, namely width R as seen in FIG. 3 and as noted above.

It is to be appreciated that the novel towing device provided by the present invention is a significant improvement in the state of the art of towing devices for motorcycles or other machines having a single spoked front wheel. My novel insert is relatively simple, and it substantially decreases the cost and complexity involved in towing such machines behind a towing vehicle.

It is thus clear from the heretofore provided description that my novel motorcycle carrier, as mounted on a towing vehicle and used to carry machines having a single front spoked wheel (whether a motorcycle having one rear wheel or other machines having additional rear wheels) is an appreciable improvement in the state of the art of devices for towing such machines. Although only a few exemplary embodiments of this invention have been described in detail, it will be readily apparent to those skilled in the art that the my novel towing device may be modified from those embodiments provided without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, the claims are intended to cover the structures described herein, and not only structural equivalents thereof, but also equivalent structures. Thus, the scope of the invention, as indicated by the appended claims rather than by the foregoing description, is intended to include variations from the embodiments provided which are nevertheless described by the broad meaning and range properly afforded to the language of the claims, or to the equivalents thereof.

I claim:

1. An apparatus for towing a machine having a single front spoked wheel at the rear of a towing vehicle, said towing vehicle having a rearwardly mounted tubular hitch receiver, said apparatus comprising:
   (a) a frame, said frame comprising
      (i) a front stop plate, said front stop plate comprising a top, a bottom portion, a right end portion, a left end portion, and a forward side portion,
      (ii) a bottom plate, said bottom plate comprising a forward portion, a right side portion, and a left side portion, and wherein said forward portion of said bottom plate is joined to said bottom portion of said front stop plate,
      (iii) a first guide member, said first guide member rigidly affixed to said right end portion and extending therefrom and rigidly joining with said right side portion, and
      (iv) a second guide member, said second guide member rigidly affixed to said left end portion and extending therefrom and rigidly joining with said left side portion,
      (v) said front stop plate and said bottom plate rigidly joined at an angle alpha, wherein said angle alpha is approximately ninety degrees (90°);
   (b) an attachment bar, said attachment bar affixed to and extending forward from said frame, said attachment bar comprising a tubular hitching bar, said attachment bar adapted to be rigidly affixed to and slidably inserted into said hitch receiver in said towing vehicle and to be fixedly but releaseably secured thereto; and (c) a wheel clamp, said wheel clamp comprising a first and a second prong, said first and second prongs comprising a flat, substantially parallel, opposing tire engaging surfaces, said first and said second prongs affixed to and extending rearwardly from said front stop plate;

(d) a footplate, said footplate affixed to said bottom plate and extending rearwardly therefrom, said footplate having an upwardly directed surface adapted to fit in a close abutting relationship against a wheel of a machine being towed when the wheel is positioned against said front stop plate.

2. The apparatus as set forth in claim 1, wherein said wheel clamp is adjustable between (i) a first width $W_1$ between said prongs, and (ii) a second width $W_2$ between said first and said second prongs.

3. The apparatus as set forth in claim 2, wherein said first and said second prongs each comprise (i) a clamping portion which is in the form of a substantially vertically oriented, generally parallelepiped shaped bracket having an interior wheel engaging portion, and (ii) a mounting portion which is generally perpendicular to the clamping portion and adapted to be secured to said front stop plate.

4. The apparatus as set forth in claim 3, further comprising an adjustably tightenable wheel securing pin, wherein said adjustably tightenable wheel securing pin is tightened to bring said interior wheel engaging portion of the first prong and the interior wheel engaging portion of the second prong into frictional engagement with a front wheel of a machine being transported.

5. The apparatus of claim 4, wherein said wheel clamp further comprises a plurality of keys, each of said plurality of keys adapted for accommodating and removeably locating therein said adjustably tightenable wheel securing pin.

6. The apparatus as set forth in claim 5, wherein said plurality of keys comprises at least three keys, and wherein (a) one of said at least three keys is located in a position corresponding to the position of a felly of a wheel of a first wheel thickness $T_1$ of a machine being towed; and (b) one of said at least three keys is located in a position corresponding to the position of a felly of a wheel of a second wheel thickness $T_2$ of a machine being towed; and (c) one of said at least three keys is located in a position corresponding to the position of a felly of a wheel of third wheel thickness $T_3$ of a machine being towed.

7. The apparatus as set forth in claim 4, wherein each of said clamping portions further comprises a multiple keyed slot, said multiple keyed slot defined by multiple keyed slot edges defining multiple keys, so that any one of the multiple keys can locate therein said adjustably tightenable wheel securing pin.

8. The apparatus in claim 4, further comprising a pliable bushing, said pliable bushing adapted to fit around said wheel securing pin so as to provide a cushion between said wheel securing pin and a rim of the front wheel of a machine being transported.

9. The apparatus as set forth in claim 3, wherein said first or said second prong further comprises an outwardly flared wheel entry portion.

10. The apparatus as set forth in claim 3, wherein said mounting portion of said first and said second prong each further comprises a plurality of slots defined by edge portions, and wherein said slots are adapted for passage of releasably securable fasteners therethough.

11. The apparatus as set forth in claim 1, further comprising a ramp, said ramp having a ground end and a footplate end, said ramp adapted to extend from ground level to said footplate end, so that a front wheel of a machine to be towed can be easily loaded into the towed position.

12. The apparatus as set forth in claim 11, wherein said ramp comprises a body portion, a landing portion, and a loading portion.

13. The apparatus as set forth in claim 12, wherein said landing portion is joined with said body portion at an angle delta ($\Delta$) of approximately one hundred fifty (150°) degrees.

14. The apparatus as set forth in claim 13, wherein said loading portion is slanted downwardly with respect to said body portion, so that said loading portion fits snugly against the upwardly directed surface of said footplate when said ramp is in the loading position.

15. The apparatus as set forth in claim 1, wherein said footplate further comprises a plurality of footplate slots defined by footplate slot edge portions, and wherein said footplate slot edge portions are adapted for passage of releasably securable fasteners therethough, and wherein said footplate may be adjusted between a preselected first rearward length $L_1$ and a preselected second rearward length $L_2$, so that said footplate is adjustable forwardly and rearwardly to accommodate any one of a desired preselected front wheel diameter D of a machine being towed.

16. The apparatus as set forth in claim 1, further comprising a plurality of stiffening angle portions between said attachment bar and said frame, said stiffening angle portions welded to said attachment bar and to said forward side portion and forming a wedge therebetween to minimize deflection between said frame and said attachment bar.

17. The apparatus of claim 1, further comprising a hitch pin, wherein said hitch pin is adapted to fixedly locate said towing apparatus with respect to said hitch receiver.

18. An apparatus for towing a machine having a single front spoked wheel at the rear of a towing vehicle, said apparatus comprising:

(a) a frame, said frame comprising
  (i) a front stop plate, said front stop plate comprising a top, a bottom portion, a right end portion and a left end portion,
  (ii) a bottom plate, said bottom plate comprising a forward portion, a right side portion, and a left side portion, and wherein said forward portion of said bottom plate is joined to said bottom portion of said front stop plate,
  (iii) a first guide member, said first guide member rigidly affixed to said right end portion and extending therefrom and rigidly joining with said right side portion, and
  (iv) a second guide member, said second guide member rigidly affixed to said left end portion and extending therefrom and rigidly joining with said left side portion;

(b) an attachment bar, said attachment bar affixed to and extending forward from said frame, said attachment bar adapted to be rigidly affixed to the rear of a towing vehicle; and (c) a wheel clamp, said wheel clamp comprising
  (i) a first prong, and
  (ii) a second prong,
  (iii) said first and second prongs affixed to and extending rearwardly from said front stop plate, and
  (iv) wherein said first and said second prongs each comprise (A) a clamping portion which is in the form of a substantially vertically oriented, generally parallelepiped shaped bracket having an interior wheel engaging portion, and (B) a mounting portion which is generally perpendicular to the clamping portion and adapted to be secured to said front stop plate, and (v) wherein said mounting portion of said first and said second prong each further comprises a plurality of slots defined by edge portions, and wherein said slots are adapted for passage of releasably securable fasteners therethough;

(vi) wherein said wheel clamp is adjustable between (A) a first width $W_1$ between said prongs, and (B) a second width $W_2$ between said first and said second prongs.

19. An apparatus for towing a machine having a single front spoked wheel at the rear of a towing vehicle, said apparatus comprising:

(a) a frame, said frame comprising
 (i) a front stop plate, said front stop plate comprising a top, a bottom portion, a right end portion and a left end portion,
 (ii) a bottom plate, said bottom plate comprising a forward portion, a right side portion, and a left side portion, and wherein said forward portion of said bottom plate is joined to said bottom portion of said front stop plate,
 (iii) a first guide member, said first guide member rigidly affixed to said right end portion and extending therefrom and rigidly joining with said right side portion, and
 (iv) a second guide member, said second guide member rigidly affixed to said left end portion and extending therefrom and rigidly joining with said left side portion;

(b) an attachment bar, said attachment bar affixed to and extending forward from said frame, said attachment bar adapted to be rigidly affixed to the rear of a towing vehicle;

(c) a wheel clamp, said wheel clamp comprising
 (i) a first prong, and
 (ii) a second prong,
 (iii) said first and second prongs affixed to and extending rearwardly from said front stop plate, and
 (iv) wherein said first and said second prongs each comprise (A) a clamping portion which is in the form of a substantially vertically oriented, generally parallelepiped shaped bracket having an interior wheel engaging portion, and (B) a mounting portion which is generally perpendicular to the clamping portion and adapted to be secured to said front stop plate, and (d) an adjustably tightenable wheel securing pin, wherein said adjustably tightenable wheel securing pin is tightened to bring said interior wheel engaging portion of the first prong and the interior wheel engaging portion of the second prong into frictional engagement with a front wheel of a machine being transported.

20. The apparatus as set forth in claim 19, wherein said wheel clamp further comprises a plurality of keys, each of said plurality of keys adapted for accommodating and removeably locating therein said adjustably tightenable wheel securing pin.

21. The apparatus as set forth in claim 20, wherein said plurality of keys comprises at least three keys, and wherein (a) one of said at least three keys is located in a position corresponding to the position of a felly of a wheel of a first wheel thickness $T_1$ of a machine being towed; and (b) one of said at least three keys is located in a position corresponding to the position of a felly of a wheel of a second wheel thickness $T_2$ of a machine being towed; and (c) one of said at least three keys is located in a position corresponding to the position of a felly of a wheel of third wheel thickness $T_3$ of a machine being towed.

22. The apparatus as set forth in claim 19, wherein each of said clamping portions further comprises a multiple keyed slot, said multiple keyed slot defined by multiple keyed slot edges defining multiple keys, so that any one of the multiple keys can locate therein said adjustably tightenable wheel securing pin.

23. The apparatus as set forth in claim 19, further comprising a pliable bushing, said pliable bushing adapted to fit around said adjustably tightenable wheel securing pin so as to provide a cushion between said adjustably tightenable wheel securing pin and a rim of the front wheel of a machine being transported.

24. The apparatus as set forth in claim 19, wherein said first or said second prong further comprises an outwardly flared wheel entry portion.

25. An apparatus for towing a machine having a single front spoked wheel at the rear of a towing vehicle, said apparatus comprising:

(a) a frame, said frame comprising
 (i) a front stop plate, said front stop plate comprising a top, a bottom portion, a right end portion and a left end portion,
 (ii) a bottom plate, said bottom plate comprising a forward portion, a rearward portion, a right side portion, and a left side portion, and wherein said forward portion of said bottom plate is joined to said bottom portion of said front stop plate,
 (iii) a first guide member, said first guide member rigidly affixed to said right end portion and extending therefrom and rigidly joining with said right side portion, and
 (iv) a second guide member, said second guide member rigidly affixed to said left end portion and extending therefrom and rigidly joining with said left side portion;

(b) an attachment bar, said attachment bar affixed to and extending forward from said frame, said attachment bar adapted to be rigidly affixed to the rear of a towing vehicle;

(c) an adjustable footplate, said adjustable footplate having a rearward tip end and adjustably affixed to said rearward portion of said bottom plate;

(d) a wheel clamp, said wheel clamp comprising a first and a second prong, said first and second prongs affixed to and extending rearwardly from said front stop plate;

(e) a ramp, said ramp having
 (i) a loading portion having a footplate end,
 (ii) a landing portion having a ground end,
 (iii) a body portion extending between said loading portion and said landing portion;
 (iv) said ramp adapted to extend from said ground end to said footplate end, and
 (v) said loading portion slanted downwardly with respect to said body portion, so that said footplate end of said ramp fits snugly against the rearward tip end of said footplate when said ramp is in the loading position, so that a front wheel of a machine to be towed can be easily loaded into the towed position.

26. The apparatus as set forth in claim 25, wherein said landing portion is joined with said body portion at an angle delta ($\Delta$) of approximately one hundred fifty (150°) degrees.

* * * * *